United States Patent Office 3,517,389
Patented June 23, 1970

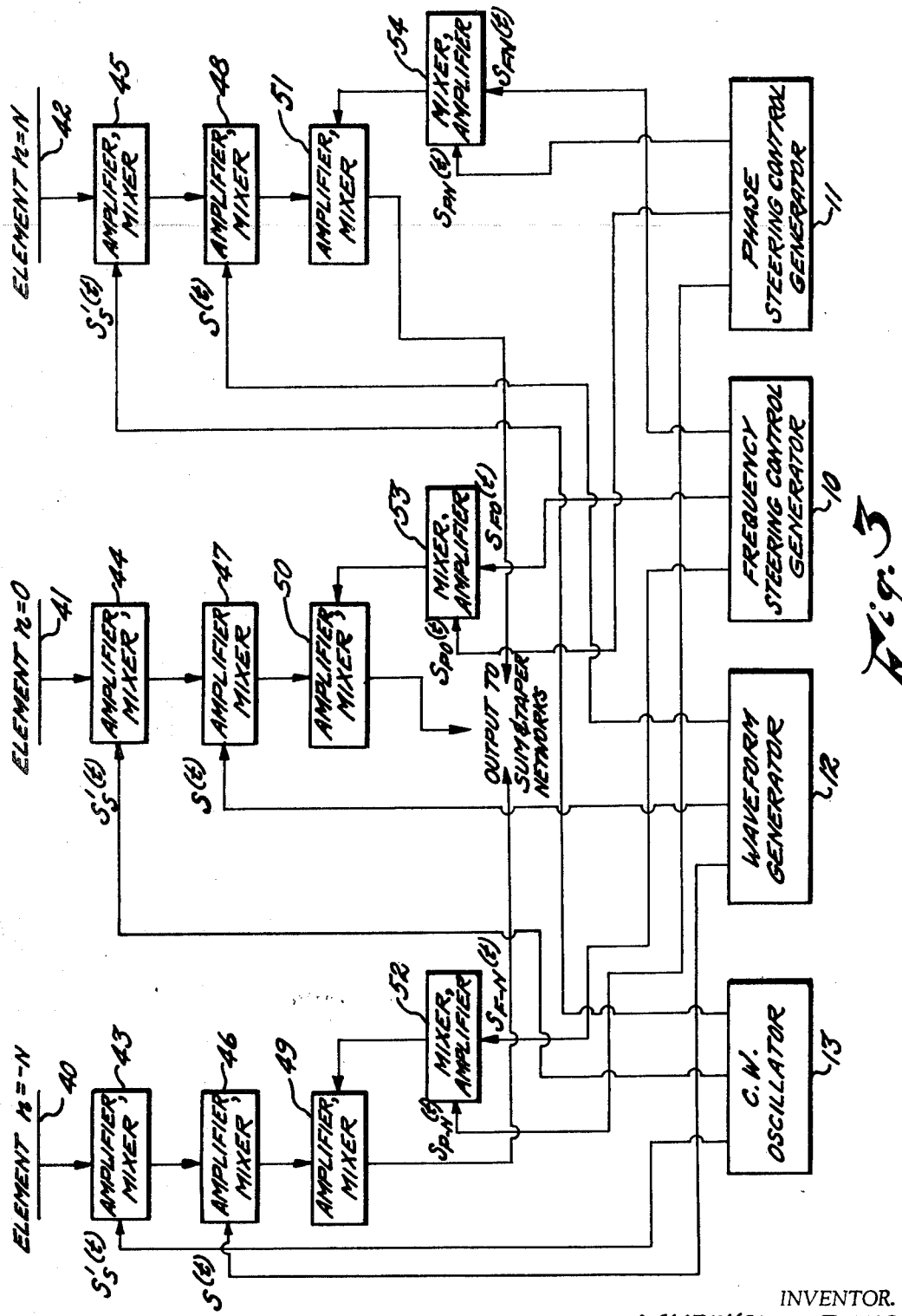

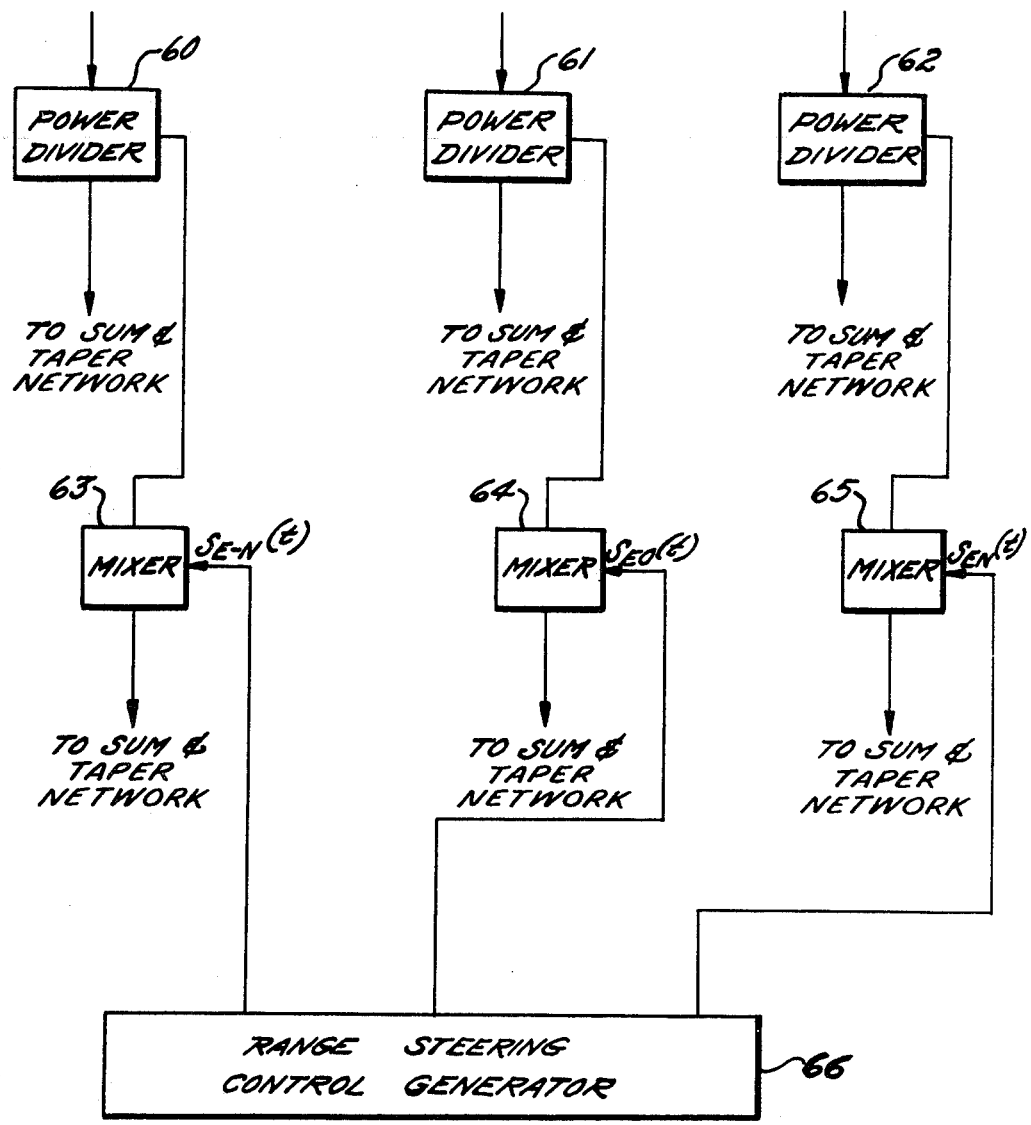

---

3,517,389
METHOD AND SYSTEM FOR ELECTRONICALLY STEERING AN ANTENNA ARRAY
Lawrence R. Dausin, Cocoa Beach, Fla., assignor to the United States of America as represented by the Secretary of the Air Force
Filed Apr. 15, 1964, Ser. No. 360,152
Int. Cl. H04b 7/04
U.S. Cl. 343—100                                    5 Claims The invention described herein may be manufactured and used by or for the United States Government for governmental purposes without payment to me of any royalty thereon.

The present invention relates to a method and system for electronically steering a radar antenna array which incorporates the use of a particular type of large time bandwidth product signal and a special steering network in order to overcome the inherent bandwidth limitation associated with a conventional electronically steerable phased array radar.

An object of the present invention is to provide a method for electronically steering a radar antenna array by importing a simulated time delay for a large time bandwidth linear frequency modulated waveform by shifting the phase and frequency of the waveform's carrier frequency for each element of aforesaid array.

Another object of the present invention is to provide a method of electronically steering the beam of a multiple element antenna array by generating linear frequency modulated pulses, and shifting the phase and frequency thereof a predetermined amount for each of aforesaid element.

For this specification, the term "electronically steerable array" is used to refer to a planar antenna comprising an array consisting of a plurality of vertically and/or horizontally polarized radiating elements which together with its associated electronic components is capable of generating a beam of radiant energy in space and of positioning the beam electronically in an inertialess manner. The term "electronically steerable phased array" refers to a sub-class of electronically steerable arrays which incorporate the technique of phase shifting the transmitted and/or received signals of an array with respect to each other in order to position the array's beam to a desired position in space.

Although not limited to such use, this invention finds particular utility in long range radar applications in which the required range resolution of the radar exceeds that obtainable from a conventional electronically steerable phased array radar. Because of the peak power limitation of transmitters, modulators, waveguide and associated equipment, the use of a plurality of transmitters in the form of an electronically steerable array has shown promise for long range radar applications. Requirements also exist for long range radars to have a fine range resolution capability of the order of a few feet which coupled with a realistic angular resolution is usually beyond that obtainable from an electronically steerable phased array.

A mathematical analysis of an electronically steerable array using a wideband signal on transmit and/or receive indicates the need for time delaying the transmitted and/or received signals of the individual elements of the array with respect to each other in order to position the array's beam to a desired angular position in space off the boresight of the array. The electronically variable time delay networks which the mathematical analysis requires for each element of the array are beyond present state-of-the-art; however, by assuming the use of a CW sinusoidal signal which has zero bandwidth on transmit and/or receive, the required time delays can be simulated by phase shifting the transmitted and/or received signals from the individual array elements with respect to each other. It is the use of this technique, the electronically steerable phase array, which has made the use of array type of radars feasible; however, the zero bandwidth assumption negates the possibility of using such a radar to obtain an extremely fine range resolution.

A more complete analysis of the electronically steerable phased array shows that a finite signal bandwidth can be used in the system; however, a point is reached where an increase of a phased array's signal bandwidth results in a decrease in angular resolution due to a broadening of the array's beam for beam positions off of boresight, over and above that expected due to a reduction in the array's projected aperture at the angular position. Wideband operation of a conventional phased array will also cause a smearing of a received signal's time envelope for positions off of boresight. This results in an upper limit on the range resolution which can be achieved. Both effects, the loss of angular resolution and the upper limit on range resolution, can be expressed as a bandwidth limitation for electronically steerable phased arrays. The limitation is caused by the use of phase shifters to simulate time delays and would not be present in a system using a true time delay steering system.

The magnitude of the bandwidth limitation will depend on the maximum extent of an array, the scan angle off of boresight, and the amplitude illumination across the array's aperture. Assuming a uniform amplitude illumination the bandwidth limitation, B, is approximately equal to:

(1)
$$B = \frac{4}{\frac{2(N+1) x \sin \theta}{c}}$$

where $(2N+1)$ $x$ is the maximum extent of the array, $\theta$, is the scan angle off of boresight and $c$ is the velocity of propagation of the transmitted and/or received signal in the medium. For a linear array radar consisting of 101 isotropic elements spaced a half wavelength apart and operating at a carrier frequency of 1 kmc. will have a bandwidth limitation of approximately 9 mc. at a scan angle off of boresight of 45 degrees. This results in a maximum obtainable range resolution of about 55 feet.

In accordance with this invention, there is included a wideband electronically steerable array which uses a particular large time bandwidth product signal and a special steering system which is capable of overcoming the bandwidth limitation of an electronically steerable phased array. In essence, the invention makes use of the time frequency ambiguity which exists for a large time bandwidth linear FM (frequency modulated) waveform. Due to the ambiguity, it is possible to impart a simulated time delay to such a waveform by shifting the phase and frequency of the waveform's carrier frequency. This method of simulating a delay of a linear FM waveform does not actually delay the waveform in time and therefore the time envelope of linear FM signals transmitted and/or received by the individual elements of an array will not completely overlap in time as the beam is steered off of boresight. The simulated delay will only insure coherent addition of the transmitted and/or received linear FM signals during their time overlap.

The inability to produce complete overlap places a limitation on the allowable time duration of the transmitted and/or received linear FM signals. Assuming a pulsed linear FM waveform, the pulsewidth must exceed the inverse of the bandwidth limitation which would be expected if the array used only a phase steering system. This restriction does not directly limit the obtainable range resolution of the invention since range resolution is dependent on transmit and/or receive signal bandwidth which for a large time bandwidth product linear FM waveform is also completely independent of the waveform's time envelope.

The invention requires the transmission and/or reception of a linear FM waveform. In its pulsed form the signal can be expressed as:

$$(2) \quad S(t=)\cos(at+bt^2)\Big|_{t=T_1}^{t=T_2}$$

where $T_2-T_1$ is the pulsewidth of the waveform and "$a$" and "$b$" are constants which determine the instantaneous frequency of the signal; that is, $2\pi f=a+2bt$. The sign of "$b$" can be either positive, negative, or alternate between transmission. Its only effect is to determine whether the signal's instantaneous frequency increases or decreases with time.

Assuming the transmission of the signal given in Equation 2, the amount of the frequency and phase of the $z^{th}$ element's carrier must be shifted with respect to the center element of the array carrier frequency is:

$$(3) \quad \Delta W_z = -2b\gamma_z \text{ rad./sec.}$$

and $$(4) \quad \Delta\psi_z = -a\gamma_z + b\gamma_z^2 \text{ rad.}$$

where $\gamma_z$ is the relative difference in propagation delay between the $z^{th}$ element and the center element, at the desired angular position of the beam off of boresight. Assuming a planar array in which the desired angular position of the beam is $\theta_h$ degrees off the horizontal boresight and $\theta_v$ degrees off the vertical boresight, the relative delay can be expressed as:

$$(5) \quad \gamma_z = \frac{x}{c}(\cos\theta_h \cos\theta_v) + \frac{y}{c}(\sin\theta_h \cos\theta_v)$$

wehre $x$ is the vertical distance between the $z^{th}$ element and the center element and $y$ is the horizontal distance between the $z^{th}$ element and the center element, the distances, $x$ and $y$, being perpendicular and measured in the plane of the array.

Normally, the horizontal and vertical beam positions of a planar array are controlled separately This is accomplished by dividing the array into a number of parallel linear arrays. The electrical characteristics of the signal transmitted and/or received by the individual elements of each linear array are varied with respect to each other to provide angular control in a direction parallel to the linear arrays. The electrical characteristics of the signals transmitted and/or received by the linear arrays are then varied from one linear array to another in order to provide angular control in the other direction. This technique is well known to those skilled in the art of designing and constructing electronically steerable arrays and therefore will not be presented in detail.

Because the normal method of controlling a planar array's beam position is to consider it as a group of parallel linear arrays and also to keep the analysis of the invention from becoming unduly complicated, only the application of the invention to linear arrays will be considered. The extension of the technique to planar arrays is straight forward for those skilled in the art of designing and constructing electronically steerable arrays.

For a linear array consisting of $(2N+1)$ isotropic radiating elements spaced X distance apart, the phase and frequency shift required between the $n^{th}$ element and the center element is:

$$(6) \quad \Delta W_n = -2bn\frac{\sin\theta}{c}X$$

and $$(7) \quad \Delta\psi_n = -an\frac{\sin\theta}{c}X + bn^2\frac{(\sin\theta)^2}{c^2}X^2$$

in order to position the array's beam $\theta$ degrees off of boresight.

The invention will now be described with reference to the accompanying drawings, in which:

FIG. 3 is a block diagram representation of the wideband electronically steerable array under received conditions; and FIG. 4 is a block diagram of the range steering control system.

Figure 1:
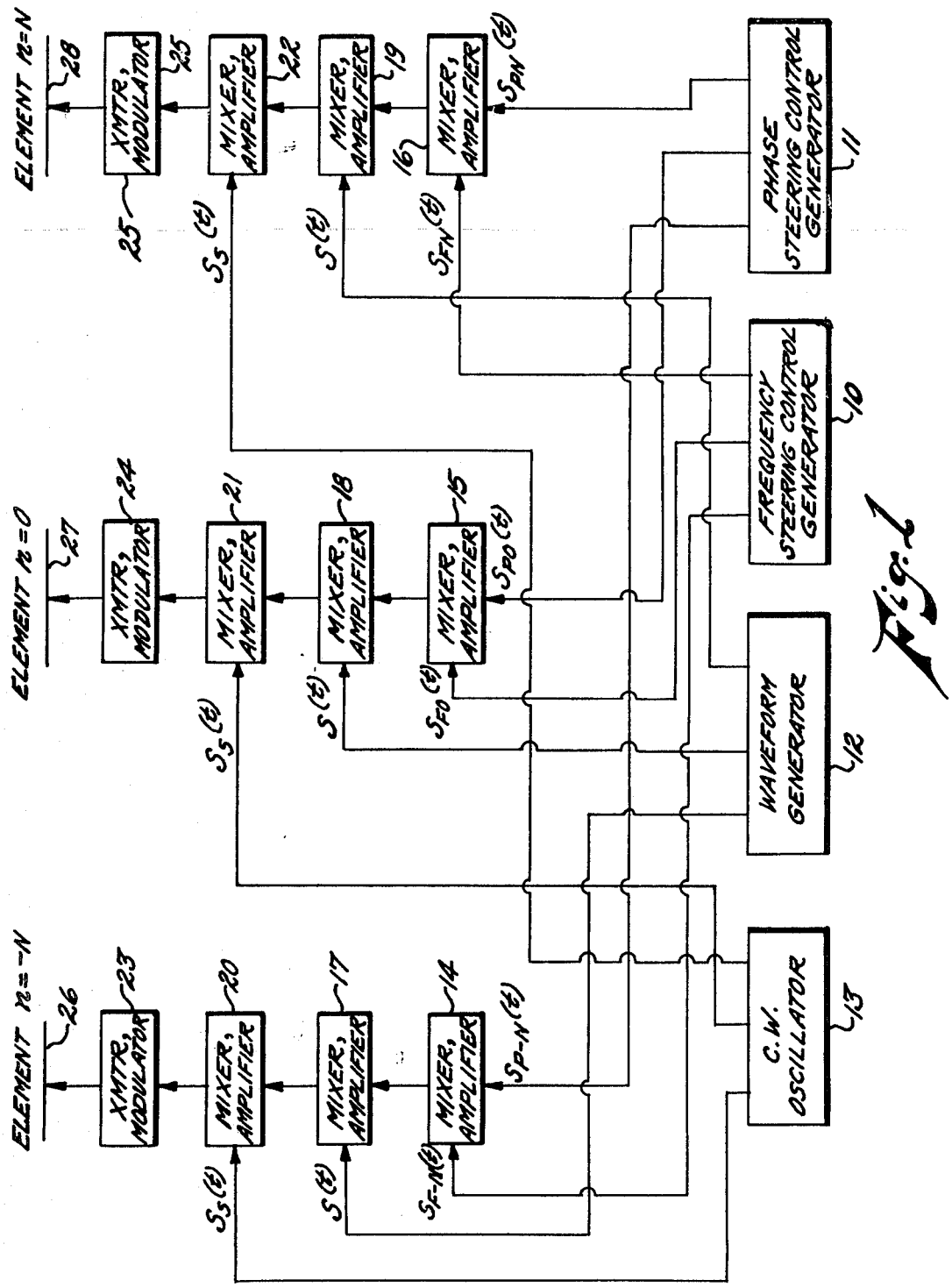
FIG. 1 is a block diagram representation of the wideband electronically steerable array under transmit conditions.

A block diagram of a method of implementing the invention on a linear array is shown in FIG. 1. The block diagram differs from that of a conventional phased array in mainly two ways. First, the invention requires the use of a linear FM generator. The generation of the waveform can be accomplished by either an active or passive technique. For the passive technique, a dispersion network constructed from passive electrical components is excited by a short pulse. Provided the dispersion network has a linear frequency delay characteristic for the bandwidth of interest, the resultant output signal will be a linear FM waveform.

For the active technique, an oscillator's frequency is varied by changing the reactance components in the oscillator's circuit or by varying the applied voltage on certain tubes (such as BWO type) which thus cause a change of the tube's output frequency. Both methods have been to actively generate linear FM waveforms. Usually, the active method requires a frequency multiplication in order to achieve the desired frequency deviation of the FM signal. The active method is more suited for use in the invention because of its relative ease in generating large time bandwidth products signals; however, either method can be used.

The second major difference between the invention and an electronically steerable phased array is the steering control signal fed to the array's individual antenna elements. In the phased array system, only a phased steering network is needed to control angular position. My invention requires a frequency shift between antenna elements as well as a phase shift. The requirement is met as shown in FIG. 1. The outputs of frequency steering control generator 10 provides a separate output for each antenna element. The outputs are mixed with outputs of phase steering control generator 11 in mixer amplifiers 14, 15, and 16, respectively; that is, the $n^{th}$ output of each generator is mixed to provide a control signal for the $n^{th}$ antenna array element. Phase steering control generator 11 is conventional and a general description of the techniques used in construction of this device is presented in Introduction to Radar Systems by Merrill I. Skolnik, section 7.7. Particular attention should be paid to pages 310 and 311. Techniques other than those mentioned in aforementioned volume are also available, in particular, the method of generating an "active" linear FM waveform which is used in the U.S. Air Force Trinidad Radar.

The resultant of this mixing operation is amplified and mixed with an output of waveform generator 12 in mixer amplifiers 17, 18, and 19, respectively. The outputs from mixer amplifiers 17, 18, and 19, are fed to mixer amplifiers 20, 21, and 22, respectively, each of which also receive an input from CW oscillator 13. The outputs of mixer amplifiers 20, 21, and 22 are fed to transmitter modulators 23, 24, and 25 which feed antenna elements 26, 27, and 28, respectively.

The only unique equipment required for the system of the present invention is the frequency steering control generator (phase steering control generators have been designed for use in phased arrays). The outputs of the frequency steering control generator must have a relative frequency shift with respect to each other as given in Equation 7. The carrier or center frequency of the outputs is not of prime importance from a mathematical standpoint; it is desirable to have the output's carrier or center frequency fairly high in order to facilitate mixing with other signals.

Figure 2:
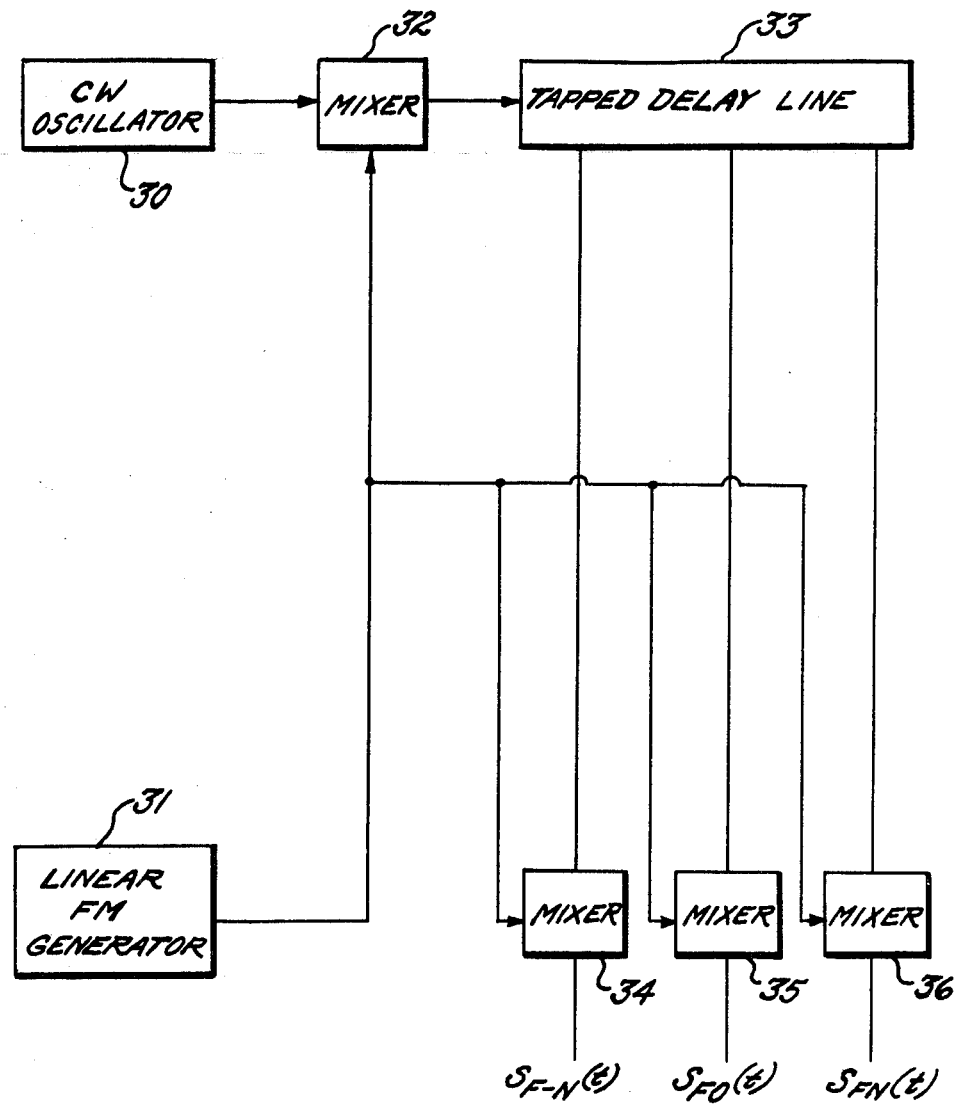
FIG. 2 is a block diagram of the frequency steering control generator shown in FIG. 1.

One method of fabricating a frequency steering control generator is shown in FIG. 2. Tapped delay line 33 is fed the output of mixer 32. Mixer 32 is simultaneously fed the output of CW oscillator 30 and the output of linear FM generator 31. Thus the output of generator 31, which has a controllable frequency time slope, is frequency shifted in mixer 32 and then fed into delay line 33. The outputs of delay line 33 are then mixed by mixers 34, 35, and 36 with the non-frequency shifted output of the linear FM generator. By controlling the slope of the frequency time characteristic of the FM generator, the relative frequency between the network's outputs can be controlled. CW oscillator 30 shown in FIG. 2 is used to control the center or carrier frequency of the outputs. It should be noted the phase relationship between the outputs of the generator will not necessarily be zero at time $t=0$, a requirement for proper operation of the invention; however, this does not present a great problem since the linear portion of the relative phase between outputs can be compensated for in the phase steering control signals. The outputs will also have a quadratic phase difference at time $t=0$, however, with proper choice of operating frequency and tap spacing, its effect can be made negligible. In further explanation of FIG. 2, CW oscillator 30 and mixer 32 have been included only to allow choice of carrier of IF center frequency used in the frequency steering control generator. It is to be noted that the output of mixer 34 is a constant frequency signal whose frequency would depend on the time delay between taps on the delay line and the rate of change of the linear FM input signal. The outputs of mixers 34, 35 and 36 would be $f_c-\Delta f$, $f_c$ and $f_c+\Delta f$, respectively. The frequency time slope of the linear FM generator, as aforementioned, used in the frequency steering control generator is variable. By varying the slope, the frequency difference between the outputs of mixers 34–36 can be varied. It should be noted that the FM generators used in the waveform generator and the frequency steering generator are completely different.

This invention is not limited to the method of design for the frequency control generator outlined above. Other methods are possible; the one described is included only to show one method to accomplish the required mathematical manipulation of the signals transmitted and/or received from the array.

The block diagram of the transmit case shown in FIG. 1 is fairly straight forward. The $n^{\text{th}}$ output of the frequency control generator and the $n^{\text{th}}$ output of the phase control generator are mixed to produce a steering control signal for the $n^{\text{th}}$ element. This signal is then amplified and mixed with the $n^{\text{th}}$ output of the waveform generator, amplified and then mixed to the proper operating. After amplification in a transmitter, the signal is fed to the $n^{\text{th}}$ element of the array. The order of the mixing operations can be changed and the number of mixers and amplifiers can be increased without affecting the feasibility or operation of the array. Only the basic steps are included in the system block diagram shown in FIG. 1. The conventional synchronization to the components of FIG. 1 are also provided by abovesaid radar transmitter.

Assuming the pulsewidth restriction of the invention is met, the summation of the transmitted signals from the array of the desired angle in space will be approximately of the form:

(8) $\quad S(t)=\cos\ [a(t-T)+b(t-T)^2]$

The received signal at the $n^{\text{th}}$ element obtained by the reflection of the above signal from a point source target will be of the form:

(9) $\quad S_{R_n}(t)=\cos\ [a(t-n\gamma-2T)+b(t-n\gamma-2T)^2]$ where $2T$ is the propagation time delay corresponding to the range of the target and $n\gamma$ is the relative difference in propagation delay between the $n^{\text{th}}$ element and the center element of the array.

A block diagram of the invention under receive conditions is shown in FIG. 3. The return signals are received by antenna elements 40, 41, and 42. They are amplified and then mixed in amplifier, mixers 43, 44, and 45, respectively, each of which also receive signals from CW oscillator 13 thus providing an IF signal for each of aforesaid amplifier mixers 43, 44, and 45. The IF signals are then amplified and then mixed by utilizing mixers 46, 47, and 48, respectively, with a replica of the tranmit signal obtained by restarting waveform generator 12 which may be accomplished by way of a synchronizing pulse provided by the way of the transmitter modulators shown in FIG. 1. Frequency steering control generator 10 is also restarted at the same time as waveform generator 12. The outputs of frequency steering control generator 10 and phase steering control generator 11 are mixed in amplifier mixers 52, 53, and 54, respectively, to produce steering control signals the same way as for the transmit case. The steering control signals from mixer amplifiers 52, 53, and 54, are then mixed by amplifier mixers 49, 50, and 51 with signals which result from the mixing of the IF received signals and the waveform generator outputs. The resultant of this mixing operation will be of the form:

(10) $\quad Sn(t)=\cos\ \{a(T_\text{K}-2T)+[b(4T^2-T_\text{K}^2)-26(T_\text{K}-2T)(t-n\gamma)]+W_\text{I}t\}$ where $T_\text{k}$ is the time the waveform generator is restarted and $W_\text{I}$ is an IF frequency of the output. The outputs of the array's receivers are then added in a sum and taper network to produce the radar's output. Sum and taper networks are conventional and are utilized in conventional electronic beam systems as shown and described in the following: Lincon Lab. Tech. Report No. 228 (A.D. 249470) published Aug. 12, 1960 entitled "Phased Array Radar Studies" Chapter I, Chapter IV, Chapter VI; Lincoln Lab. Tech. Report No. 323 published July 25, 1963 (page 5, page 6, pages 11–13, and pages 74–92); Electronic Design Magazine published Apr. 12, 1961 (Beam Forming Matrix Simplifies Design of Electronically Scanned Antennas by Jesse Butler and Ralph Lowe) pages 170–173. The frequency of the output is directly related to the time delay between the arrival of the received signal of the center element of the array and the restarting of the waveform generator, assuming the Doppler shift of the signal return is zero.

Unfortunately, the receive system just described will only respond to target ranges in the vicinity of a range corresponding to $T_\text{k}$. The width over which the system will respond depends on the radar's parameters. For example, a linear array of 101 elements spaced a half wavelength apart, transmitting a pulsewidth of 10 $\mu$sec. and a bandwith of 50 mc. will only respond to a range increment corresponding to about 5.7 $\mu$sec. assuming a transmit center frequency of 1 kmc. and a scan angle of 45 degrees off of boresight.

In order to interrogate more than one range increment, a relative phase shift, $2b\Delta Tn\gamma$, can be added to the outputs of the individual receiver chains. One way to accomplish this is to provide a range steering generator as shown in FIG. 4.

The outputs from amplifier mixers 49, 50, and 51 of FIG. 3 are fed to power dividers 60, 61, and 62 for division so that a pair of outputs are provided from each one of said outputs going to aforementioned conventional sum and taper networks and the other going to the associated mixers 63, 64, and 65, respectively. Mixers 63, 64, and 65 also simultaneously receive a signal from range steering control generator 66 thereby providing a resultant signal from each which is fed to conventional sum and taper networks. Range steering control generator 66 must provide constant frequency variable phase output signals. The same type of signals must be provided by phase steering generator 11 and therefore the same techniques can be used in the construction of both generators.

The $n^{\text{th}}$ output of the generator will be of the form:

(11) $\quad S_{E_n}(t) = \cos (W_E t - 2b\Delta T n\gamma)$ which when mixed with a power divided output of the $n^{\text{th}}$ element's receiver chain will allow the addition of the $2N+1$ phase shifted outputs in an aforementioned conventional sum and taper network to produce a system response between $T_k + \Delta T/2$ and $T_k + 3\Delta T/2$. Additional outputs for other range increments can be provided in a similar manner.

By proper choice of "$a$" and "$b$" in Equation 6, it is possible to neglect quadratic phase shift called for in Equation 8. For example, an array of 101 elements spaced a half wavelength apart with a center frequency of 1 kmc. For a transmit bandwidth of 50 mc. and a pulsewidth of 10 $\mu$sec., the quadratic phase shift between the center element and the end element will only be approximately 0.3 degrees. Such a figure is smaller than the phase tolerance of existing equipment. Being able to neglect the quadratic phase term allows the use of a conventional phase steering matrix used in electronically steerable phased arrays.

What I claim is:

1. The method of electronically steering the beam of a multiple element antenna array over a predetermined angular range wherein each of said elements is included in an associated transmitting channel comprising generating linear frequency modulated pulses for transmission in each of said channels, shifting the frequency in each of said transmitting channels a predetermined amount, simultaneously shifting the phase in each of said transmitting channels is a predetermined amount, said frequency shift and said phase shift being proportional to the steering angle of said beam.

2. The method of electronically steering the beam of a multiple element antenna array wherein each of said elements is included in a transmitting channel, comprising generating linear frequency modulated pulses for transmission in each of said channels, shifting the phase in each of said channels, simultaneously shifting the frequency in each of said channels to provide a plane wavefront of constant phase transmitted from said array.

3. The method of electronically steering the beam of a multiple element antenna array over a predetermined angular range wherein each of said elements is included in an associated transmitting channel comprising generating linear frequency modulated pulses, dividing said pulses for distribution to each of said transmission channels, shifting the phase in each of said transmission channels a predetermined amount, and simultaneously shifting the frequency in each of said channels a predetermined amount, said shifting of phase and frequency thus providing a plane wavefront of constant phase.

4. The method of electronically steering the beam of a multiple element antenna array for a predetermined angular range wherein each of said elements is included in an associated transmitting channel comprising generating linear frequency modulated pulses, dividing said pulses equally in each of said transmitting channels, and shifting the phase and frequency of the carrier frequency of said linear frequency modulated pulses in each of said channels a predetermined amount to simulate a predetermined delay in each of said channels thus insuring coherent addition of said transmitted linear frequency modulated pulses.

5. The method of electronically steering the beam of a multiple element antenna array over a predetermined angular range wherein each of said elements is included in an associated transmitting channel comprising generating linear frequency modulated pulses for distribution to each of said transmitting channels, feeding a steering control signed to each of said elements by way of its associated transmitting channel, and shifting the frequency and phase of said steering control signal.

No references cited.

RODNEY D. BENNETT, JR., Primary Examiner

T. H. TUBBESING, Assistant Examiner

U.S. Cl. X.R.

343—17.2, 854